(12) United States Patent
Wang et al.

(10) Patent No.: US 10,717,668 B2
(45) Date of Patent: *Jul. 21, 2020

(54) LOCALIZED HEATING VIA AN INFRARED HEAT SOURCE ARRAY OF EDGE SEALS FOR A VACUUM INSULATING GLASS UNIT, AND/OR UNITIZED OVEN WITH INFRARED HEAT SOURCE ARRAY FOR ACCOMPLISHING THE SAME

(71) Applicant: Guardian Glass, LLC, Auburn Hills, MI (US)

(72) Inventors: Hong Wang, Shanghai (CN); David J. Cooper, Canton, MI (US)

(73) Assignee: GUARDIAN GLASS, LLC., Auburn Hill, MI (US)

( * ) Notice: Subject to any disclaimer, the term of this patent is extended or adjusted under 35 U.S.C. 154(b) by 108 days.

This patent is subject to a terminal disclaimer.

(21) Appl. No.: 16/401,447

(22) Filed: May 2, 2019

(65) Prior Publication Data

US 2019/0256396 A1    Aug. 22, 2019

Related U.S. Application Data

(63) Continuation of application No. 15/725,528, filed on Oct. 5, 2017, now Pat. No. 10,294,140, which is a
(Continued)

(51) Int. Cl.
*E06B 3/66* (2006.01)
*C03B 23/24* (2006.01)
(Continued)

(52) U.S. Cl.
CPC ............ *C03B 23/245* (2013.01); *C03C 27/06* (2013.01); *E06B 3/6612* (2013.01);
(Continued)

(58) Field of Classification Search
CPC ..... C03B 23/245; C03C 27/06; E06B 3/6612; E06B 3/67339; E06B 3/6775
See application file for complete search history.

(56) References Cited

U.S. PATENT DOCUMENTS 3,632,324 A    1/1972    Sasaki et al.
4,088,522 A    5/1978    Mercier et al.
(Continued)

FOREIGN PATENT DOCUMENTS

AU          60 657       1/1967
CN       1676481 A      10/2005
(Continued)

OTHER PUBLICATIONS

U.S. Appl. No. 15/725,528, filed Oct. 5, 2017; Wang et al.
(Continued)

*Primary Examiner* — Joseph S Del Sole
*Assistant Examiner* — John Robitaille

(57) ABSTRACT

Certain example embodiments of this invention relate to edge sealing techniques for vacuum insulating glass (VIG) units. More particularly, certain example embodiments relate to techniques for providing localized heating to edge seals of units, and/or unitized ovens for accomplishing the same. In certain example embodiments, a unit is pre-heated to one or more intermediate temperatures, localized heating via at least one substantially two-dimensional array of heat sources is provided proximate to the peripheral edges of the unit so as to melt frits placed thereon, and cooled. In certain non-limiting implementations, the pre-heating and/or cooling may be provided in one or more steps. An oven for accomplishing the same may include multiple zones for performing the above-noted steps, each zone optionally including one or more chambers. Accordingly, in certain example embodiments, a temperature gradient proximate to the edges of the unit is created, thereby reducing the chances
(Continued)

of breakage and/or at least some de-tempering of the substrates.

11 Claims, 11 Drawing Sheets

Related U.S. Application Data continuation of application No. 14/975,908, filed on Dec. 21, 2015, now Pat. No. 9,783,447, which is a continuation of application No. 13/942,734, filed on Jul. 16, 2013, now Pat. No. 9,221,707, which is a continuation of application No. 12/000,791, filed on Dec. 17, 2007, now Pat. No. 8,506,738.

(51) Int. Cl.
    *C03C 27/06*     (2006.01)
    *E06B 3/673*     (2006.01)
    *E06B 3/677*     (2006.01)

(52) U.S. Cl.
    CPC ........ *E06B 3/6775* (2013.01); *E06B 3/67339* (2013.01); *E06B 3/6736* (2013.01); *Y02A 30/25* (2018.01); *Y02B 80/24* (2013.01)

(56) References Cited

U.S. PATENT DOCUMENTS

| | | | |
|---|---|---|---|
| 4,820,365 | A | 4/1989 | Brumm et al. |
| 5,657,607 | A | 8/1997 | Collins et al. |
| 5,664,395 | A | 9/1997 | Collins et al. |
| 5,902,652 | A | 5/1999 | Collins et al. |
| 6,365,242 | B1 | 4/2002 | Veerasamy |
| 6,383,580 | B1 | 5/2002 | Aggas |
| 6,399,169 | B1 | 6/2002 | Wang et al. |
| 6,444,281 | B1 | 9/2002 | Wang et al. |
| 6,503,583 | B2 | 1/2003 | Nalepka et al. |
| 6,541,083 | B1 | 4/2003 | Landa et al. |
| 6,635,321 | B2 | 10/2003 | Wang et al. |
| 6,641,689 | B1 | 11/2003 | Aggas |
| 6,692,600 | B2 | 2/2004 | Veerasamy et al. |
| 6,701,749 | B2 | 3/2004 | Wang et al. |
| 6,926,782 | B2 | 8/2005 | McGlinchy |
| 6,946,171 | B1 | 9/2005 | Aggas |
| 7,244,480 | B2 | 7/2007 | Minaai et al. |
| 8,506,738 | B2 | 8/2013 | Wang et al. |
| 9,221,707 | B2 | 12/2015 | Wang et al. |
| 9,783,447 | B2 | 10/2017 | Wang et al. |
| 2006/0042748 | A1 | 3/2006 | Hasegawa et al. |

FOREIGN PATENT DOCUMENTS

| | | |
|---|---|---|
| DE | 195 45 422 | 6/1997 |
| EP | 0 061 183 | 9/1982 |
| EP | 1 216 971 | 6/2002 |
| EP | 1 571 134 | 9/2005 |
| EP | 2 017 236 | 1/2009 |
| JP | 2002-137939 | 5/2002 |
| SU | 852811 | 8/1981 |
| SU | 1590472 | 9/1990 |
| SU | 1694561 | 11/1991 |
| SU | 1791433 | 1/1993 |
| WO | WO 96/02473 | 2/1996 |
| WO | WO 02/14640 | 2/2002 |
| WO | WO 02/27135 | 4/2002 |
| WO | WO 2006/044383 | 4/2006 |

OTHER PUBLICATIONS

U.S. Appl. No. 15/613,472, filed Jun. 5, 2017; Cooper.
U.S. Appl. No. 14/975,908, filed Dec. 21, 2015; Wang et al.
U.S. Appl. No. 13/942,734, filed Jul. 16, 2013; Wang et al.
Office Action dated May 28, 2014 for CN Application No. 200880121170.8.
U.S. Appl. No. 13/934,256, filed Jul. 3, 2013; Cooper.
U.S. Appl. No. 12/000,791, filed Dec. 17, 2007; Wang et al.
U.S. Appl. No. 12/000,663, filed Dec. 14, 2007; Cooper.
U.S. Appl. No. 12/453,221, filed May 1 2009; Wang.
U.S. Appl. No. 13/137,660, filed Sep. 1, 2011; Wang.
International Search Report dated Jul. 8, 2010.
International Search Report dated Mar. 18, 2009.
International Search Report dated Apr. 9, 2009.

US 10,717,668 B2

LOCALIZED HEATING VIA AN INFRARED HEAT SOURCE ARRAY OF EDGE SEALS FOR A VACUUM INSULATING GLASS UNIT, AND/OR UNITIZED OVEN WITH INFRARED HEAT SOURCE ARRAY FOR ACCOMPLISHING THE SAME

This application is a continuation of application Ser. No. 15/725,528, filed Oct. 5, 2017, which is a continuation of application Ser. No. 14/975,908, filed Dec. 21, 2015 (U.S. Pat. No. 9,783,447), which is a continuation of application Ser. No. 13/942,734, filed Jul. 16, 2013 (now U.S. Pat. No. 9,221,707), which is a continuation of application Ser. No. 12/000,791, filed Dec. 17, 2007 (now U.S. Pat. No. 8,506,738), the entire disclosures of which are all hereby incorporated herein by reference in this application.

FIELD OF THE INVENTION

Certain example embodiments of this invention relate to edge sealing techniques for vacuum insulating glass (VIG) units. More particularly, certain example embodiments relate to techniques for providing localized heating to edge seals of units, and/or unitized ovens for accomplishing the same. In certain example embodiments, a unit is pre-heated to one or more intermediate temperature(s), localized heating via at least one substantially two-dimensional array of heat sources is provided proximate to the peripheral edges of the unit so as to melt frit(s) placed thereon, and the unit is cooled. In certain example implementations, the pre-heating and/or cooling may be provided in one or more steps. An oven for accomplishing the same may include multiple zones for performing the above-noted steps, each zone optionally including one or more chambers.

BACKGROUND AND SUMMARY OF EXAMPLE EMBODIMENTS OF THE INVENTION

Vacuum IG units are known in the art. For example, see U.S. Pat. Nos. 5,664,395, 5,657,607, and 5,902,652, the disclosures of which are all hereby incorporated herein by reference.

FIGS. 1-2 illustrate a conventional vacuum IG unit (vacuum IG unit or VIG unit). Vacuum IG unit 1 includes two spaced apart glass substrates 2 and 3, which enclose an evacuated or low pressure space 6 therebetween. Glass sheets/substrates 2 and 3 are interconnected by peripheral or edge seal of fused solder glass 4 and an array of support pillars or spacers 5.

Pump out tube 8 is hermetically sealed by solder glass 9 to an aperture or hole 10 which passes from an interior surface of glass sheet 2 to the bottom of recess 11 in the exterior face of sheet 2. A vacuum is attached to pump out tube 8 so that the interior cavity between substrates 2 and 3 can be evacuated to create a low pressure area or space 6. After evacuation, tube 8 is melted to seal the vacuum. Recess 11 retains sealed tube 8. Optionally, a chemical getter 12 may be included within recess 13.

Conventional vacuum IG units, with their fused solder glass peripheral seals 4, have been manufactured as follows. Glass frit in a solution (ultimately to form solder glass edge seal 4) is initially deposited around the periphery of substrate 2. The other substrate 3 is brought down over top of substrate 2 so as to sandwich spacers 5 and the glass frit/solution therebetween. The entire assembly including sheets 2, 3, the spacers, and the seal material is then heated to a temperature of approximately 500° C., at which point the glass frit melts, wets the surfaces of the glass sheets 2, 3, and ultimately forms hermetic peripheral or edge seal 4. This approximately 500° C. temperature is maintained for from about one to eight hours. After formation of the peripheral/edge seal 4 and the seal around tube 8, the assembly is cooled to room temperature. It is noted that column 2 of U.S. Pat. No. 5,664,395 states that a conventional vacuum IG processing temperature is approximately 500° C. for one hour. Inventor Collins of the '395 patent states in "Thermal Outgassing of Vacuum Glazing," by Lenzen, Turner and Collins, that "the edge seal process is currently quite slow: typically the temperature of the sample is increased at 200° C. per hour, and held for one hour at a constant value ranging from 430° C. and 530° C. depending on the solder glass composition." After formation of edge seal 4, a vacuum is drawn via the tube to form low pressure space 6.

Unfortunately, the aforesaid high temperatures and long heating times of the entire assembly utilized in the formulation of edge seal 4 are undesirable, especially when it is desired to use a heat strengthened or tempered glass substrate(s) 2, 3 in the vacuum IG unit. As shown in FIGS. 3-4, tempered glass loses temper strength upon exposure to high temperatures as a function of heating time. Moreover, such high processing temperatures may adversely affect certain low-E coating(s) that may be applied to one or both of the glass substrates in certain instances.

FIG. 3 is a graph illustrating how fully thermally tempered plate glass loses original temper upon exposure to different temperatures for different periods of time, where the original center tension stress is 3,200 MU per inch. The x-axis in FIG. 3 is exponentially representative of time in hours (from 1 to 1,000 hours), while the y-axis is indicative of the percentage of original temper strength remaining after heat exposure. FIG. 4 is a graph similar to FIG. 3, except that the x-axis in FIG. 4 extends from zero to one hour exponentially.

Seven different curves are illustrated in FIG. 3, each indicative of a different temperature exposure in degrees Fahrenheit (° F.). The different curves/lines are 400° F. (across the top of the FIG. 3 graph), 500° F., 600° F., 700° F., 800° F., 900° F., and 950° F. (the bottom curve of the FIG. 3 graph). A temperature of 900° F. is equivalent to approximately 482° C., which is within the range utilized for forming the aforesaid conventional solder glass peripheral seal 4 in FIGS. 1-2. Thus, attention is drawn to the 900° F. curve in FIG. 3, labeled by reference number 18. As shown, only 20% of the original temper strength remains after one hour at this temperature (900° F. or 482° C.). Such a significant loss (i.e., 80% loss) of temper strength is of course undesirable.

In FIGS. 3-4, it is noted that much better temper strength remains in a thermally tempered sheet when it is heated to a temperature of 800° F. (about 428° C.) for one hour as opposed to 900° F. for one hour. Such a glass sheet retains about 70% of its original temper strength after one hour at 800° F., which is significantly better than the less than 20% when at 900° F. for the same period of time.

Another advantage associated with not heating up the entire unit for too long is that lower temperature pillar materials may then be used. This may or may not be desirable in some instances.

Even when non-tempered glass substrates are used, the high temperatures applied to the entire VIG assembly may melt the glass or introduce stresses. These stresses may increase the likelihood of deformation of the glass and/or breakage.

Thus, it will be appreciated that there is a need in the art for a vacuum IG unit, and corresponding method of making the same, where a structurally sound hermetic edge seal may be provided between opposing glass sheets. There also exists a need in the art for a vacuum IG unit including tempered glass sheets, wherein the peripheral seal is formed such that the glass sheets retain more of their original temper strength than with a conventional vacuum IG manufacturing technique where the entire unit is heated in order to form a solder glass edge seal.

An aspect of certain example embodiments of this invention relates to applying localized heating to the periphery of a unit to form edge seals to reduce the heating of the non-peripheral areas of the unit and thereby reduce the chances of the substrates breaking.

An aspect of certain example embodiments relates to providing staged heating, localized heating, and staged cooling of a unit via a unitized oven, the localized heating being provided by a substantially linear focused infrared (IR) heat source comprising an array or matrix of linear heat sources.

Another aspect of certain example embodiments relates to providing a vacuum IG unit having a peripheral or edge seal formed so that at least certain portion(s) of thermally tempered glass substrates/sheets of the vacuum IG unit retain more of their original temper strength than if conventional edge seal forming techniques were used with the solder glass edge seal material.

Another aspect of certain example embodiments relates to providing a vacuum IG unit, and method of making the same, wherein at least a portion of the resulting thermally tempered glass substrate(s) retain(s) at least about 50% of original temper strength after formation of the edge seal (e.g., solder glass edge seal).

Another aspect of certain example embodiments relates to reducing the amount of post-tempering heating time necessary to form a peripheral/edge seal in a vacuum IG unit.

In certain example embodiments of this invention, there is provided a method of making a vacuum insulating glass (VIG) window unit, the method comprising: providing first and second substantially parallel spaced-apart glass substrates and a frit provided at least partially between the first and second glass substrates for sealing an edge of the VIG window unit; pre-heating the glass substrates and the frit to at least one temperature below a melting point of the first and second substrates and below a melting point of the frit; providing localized near infrared (IR) inclusive heat via at least one substantially two-dimensional array of heat sources proximate to the edge to be sealed so as to at least partially melt the frit; and cooling the unit and allowing the frit to harden in making the vacuum insulating glass (VIG) window unit.

In certain example embodiments of this invention, a method of making a vacuum insulating glass unit including an edge seal thereof is provided. There is provided a unit comprising first and second substantially parallel spaced-apart glass substrates, one or more edges between the first and second substrates to be sealed, and a frit for sealing each said edge to be sealed. The unit is pre-heated in its entirety to at least one intermediate temperature, each said intermediate temperature being below a melting point of the first and second substrates and below a melting point of the frit. Via near infrared radiation generated via at least one substantially two-dimensional array of heat sources, localized heat is provided to the unit proximate to the edges to be sealed at a frit melting temperature, the frit melting temperature being sufficiently high to melt the frit, the localized heat being provided to the unit such that areas of the unit not proximate to the edges to be sealed are maintained at a temperature close to an intermediate temperature. The unit is cooled in its entirety to at least one reduced temperature and the frit is allowed to harden.

In certain example embodiments, a method of making an edge seal for a vacuum insulating glass unit is provided. An oven including entrance, edge sealing, and exit zones is provided. A unit comprising first and second substantially parallel spaced-apart glass substrates, one or more edges between the first and second substrates to be sealed, and a frit for sealing each said edge to be sealed is inserted into the oven. In the entrance zone of the oven, the unit is pre-heated in its entirety to at least one intermediate temperature, each said intermediate temperature being below a melting point of the first and second substrates and below a melting point of the frit. In the edge sealing zone of the oven, there is provided, via a localized heat source comprising at least one substantially two-dimensional array of heat sources, localized heat to the unit proximate to the edges to be sealed at a frit melting temperature, the frit melting temperature being sufficiently high enough to melt the frit, the localized heat being provided to the unit such that areas of the unit not proximate to the edges to be sealed are maintained at a temperature close to an intermediate temperature. In the exit zone of the oven, the unit is cooled in its entirety to at least one reduced temperature and the frit is allowed to harden.

In certain example embodiments, an apparatus for forming edge seals for vacuum insulating glass units is provided. An entrance zone is provided for receiving a unit comprising first and second substantially parallel spaced-apart glass substrates, one or more edges between the first and second substrates to be sealed, and a frit for sealing each said edge to be sealed, and for pre-heating the unit in its entirety to at least one intermediate temperature, each said intermediate temperature being below a melting point of the first and second substrates and below a melting point of the frit. An edge sealing zone including a localized heat source comprising at least one substantially two-dimensional array of heat sources is provided for providing localized heat to the unit proximate to the edges to be sealed at a frit melting temperature, the frit melting temperature being sufficiently high enough to melt the frit, the localized heat being provided to the unit such that areas of the unit not proximate to the edges to be sealed are maintained at a temperature close to an intermediate temperature. An exit zone of the oven is provided for cooling the unit in its entirety to at least one reduced temperature and allowing the flit to harden.

In certain example implementations, the heat sources in the array are arranged in a plurality of rows and columns, and the rows and/or columns are staggered in certain example implementations. In certain example implementations, each heat source in each row and column of the array may be selectively activated in dependence on whether an edge to be sealed is proximate to the heat source.

The features, aspects, advantages, and example embodiments described herein may be combined to realize yet further embodiments.

BRIEF DESCRIPTION OF THE DRAWINGS

These and other features and advantages may be better and more completely understood by reference to the following detailed description of exemplary illustrative embodiments in conjunction with the drawings, of which.

DETAILED DESCRIPTION OF EXAMPLE EMBODIMENTS OF THE INVENTION

Figure 2:
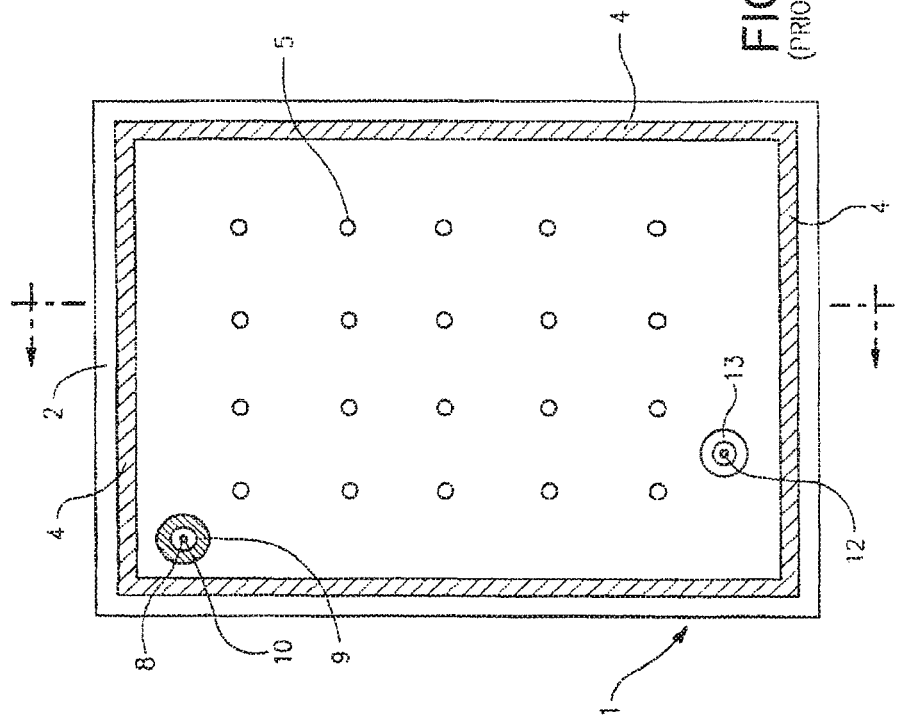
FIG. 2 is a prior art top plan view of the bottom substrate, edge seal, and spacers of the FIG. 1 vacuum IG unit taken along the section line illustrated in FIG. 1.
Figure 1:
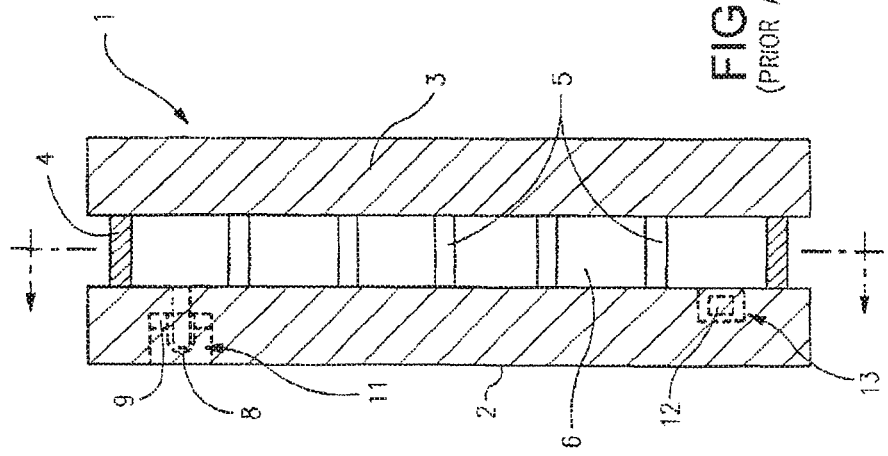
FIG. 1 is a prior art cross-sectional view of a conventional vacuum IG unit.
Figure 3:
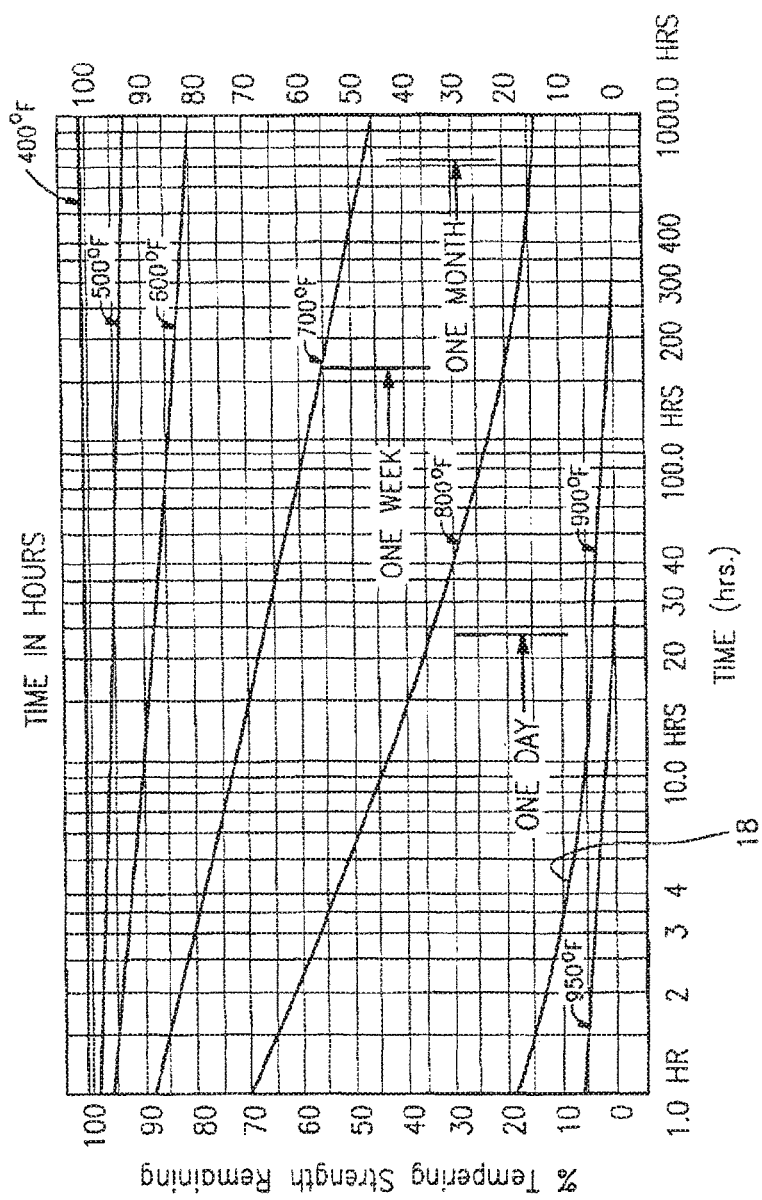
FIG. 3 is a graph correlating time (hours) versus percent tempering strength remaining, illustrating the loss of original temper strength for a thermally tempered sheet of glass after exposure to different temperatures for different periods of time.
Figure 4:
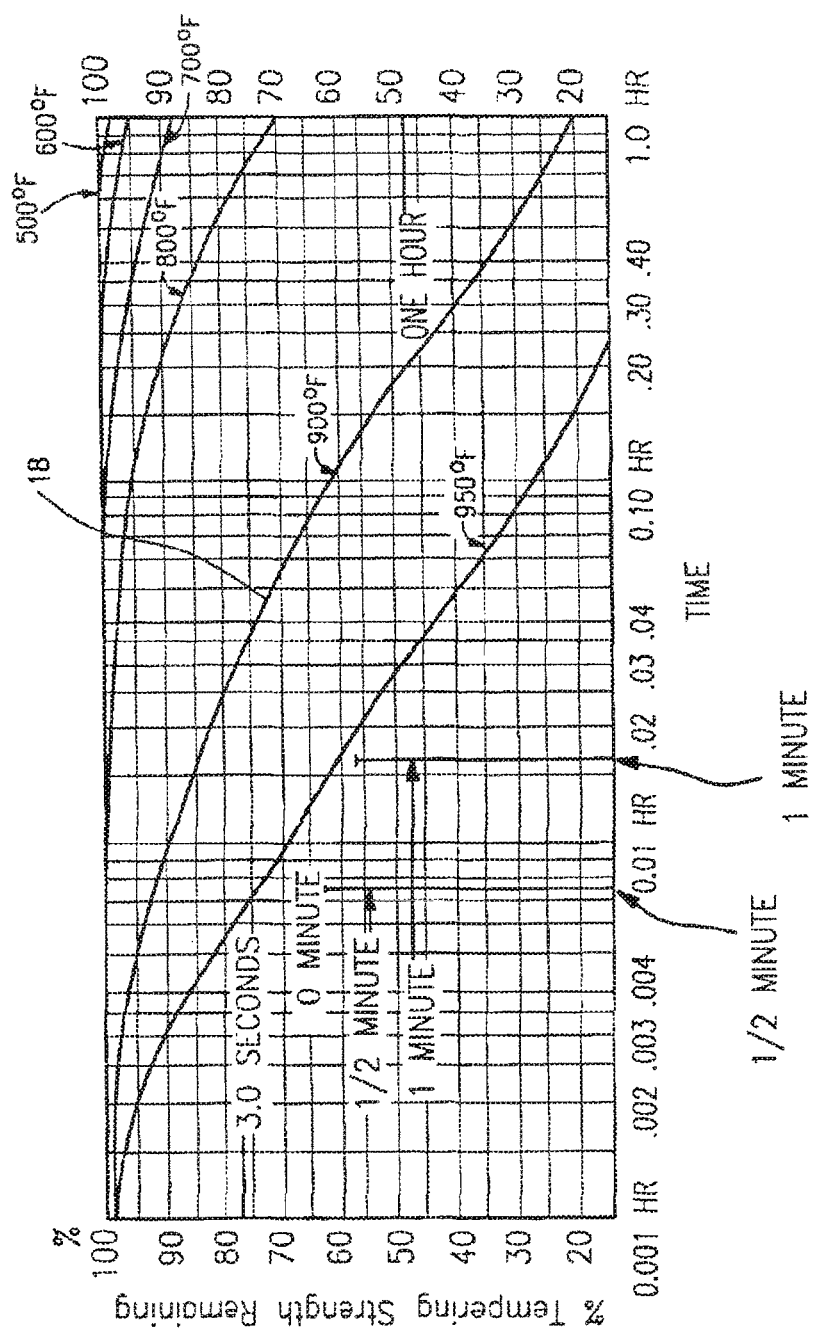
FIG. 4 is a graph correlating time versus percent tempering strength remaining similar to that of FIG. 3, except that a smaller time period is provided on the x-axis.

Certain embodiments of this invention relate to an improved peripheral or edge seal in a vacuum IG window unit, and/or a method of making the same. "Peripheral" and "edge" seals herein do not mean that the seals are located at the absolute periphery or edge of the unit, but instead mean that the seal is at least partially located at or near (e.g., within about two inches) an edge of at least one substrate of the unit. Likewise. "edge" as used herein is not limited to the absolute edge of a glass substrate but also may include an area at or near (e.g., within about two inches) of an absolute edge of the substrate(s). Also, it will be appreciated that as used herein the term "VIG assembly" refers to an intermediate product prior to the VIG's edges being sealed and evacuation of the recess including, for example, two parallel-spaced apart substrates and a frit. Also, while the frit may be said to be "on" or "supported" by one or more of the substrates herein, this does not mean that the frit must directly contact the substrate(s). In other words, the word "on" covers both directly and indirectly on, so that the frit may be considered "on" a substrate even if other material (e.g., a coating and/or thin film) is provided between the substrate and the frit.

In certain example embodiments of this invention, a method of preferential heating for frit edge seal of vacuum insulated glass units using a unitized zoned oven is provided. The pre-assembled unit is first heated to an intermediate temperature lower than that required to melt the frit seal (e.g., a temperature of about 200-300° C.). Then, the edge of the unit is further heated with localized heat from a substantially linear focused infrared (IR) heat source and/or via at least one substantially two-dimensional array of heat sources that is configured to generate IR radiation at a near infrared wavelength (e.g., a wavelength of about 0.7-5.0 µm) and, more preferably, of about 1.1-1.4 µm, in order to provide a localized temperature of from about 350-500° C. until the frit is melted. At the same time, if tempered or heat strengthened glass is used, at least certain portions of a thermally tempered glass sheet(s)/substrate(s) of the VIG unit lose no more than about 50% of original temper strength, as the majority of the area is still under the intermediate temperature. Because of the overall lower temperature, the techniques of certain example embodiments advantageously consume less energy and save time when the samples cool down. It will be appreciated that the localized temperature may be determined based in part on the material(s) comprising the frit. For example, lead-inclusive frits tend to require lower temperatures than silver-inclusive frits.

The unitized oven of certain example embodiments includes multiple chambers. Generally, the chambers will correspond to an entrance zone, an edge sealing zone, and an exit zone. It will be appreciated that an illustrative unitized oven may include multiple chambers for accomplishing the functionality of a single zone (e.g., two entrance chambers may be provided for performing entrance zone functionality, two exit chambers may be providing for performing exit zone functionality, etc.), and/or that a single chamber may be provided to accomplish the functionality associated with multiple zones (for example, a single chamber may provide entrance and exit zone functionality, etc.).

Figure 5:
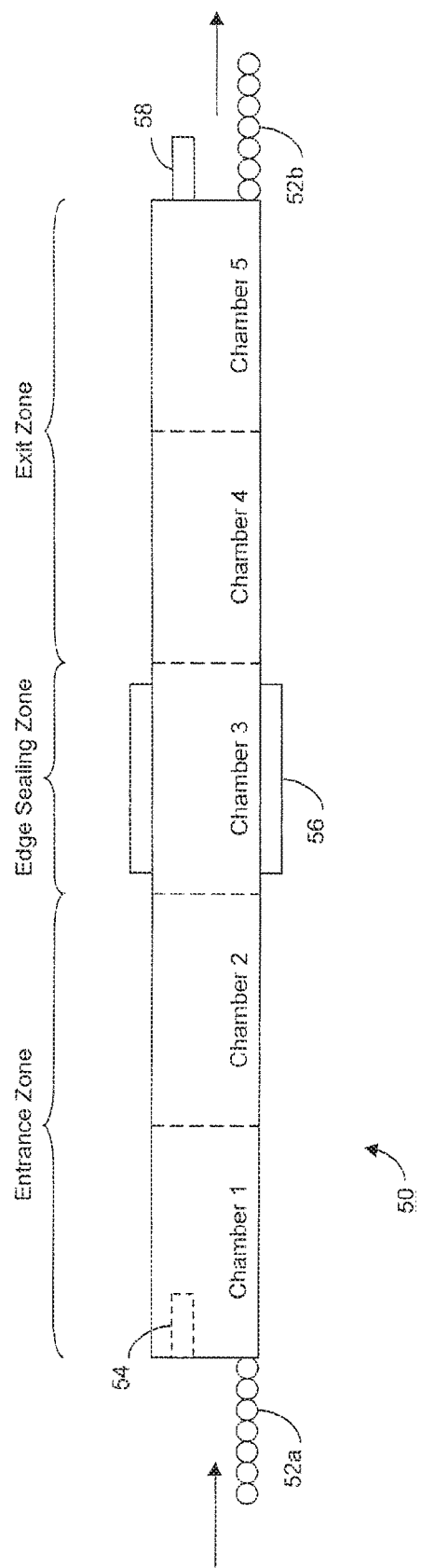
FIG. 5 is a simplified side view illustrating an example layout of a five chamber oven in accordance with an example embodiment.

By way of example and without limitation, FIG. 5 is a simplified side view illustrating an example layout of a five chamber oven 50 in accordance with an example embodiment. However, as alluded to above, it will be appreciated that more or fewer chambers may be employed. In certain non-limiting implementations, adjacent chambers may be separated by sealing doors (represented by dashed lines in between adjacent chambers) located between them. Linkage, pulleys, and/or other means may be provided to open and close such doors.

The unitized oven 50 of certain example embodiments is semi-continuous in terms of product flow. A roller conveyer 52 or other transport technique may be used to physically move a given VIG assembly from one zone and/or chamber to the next so that the VIG assembly and/or its contents are not disturbed or repositioned relative to one another. At a start point 52a, the roller conveyer 52 feeds VIG assemblies into the oven 50, e.g., through a first door 54. VIG assemblies may be moved into place and stopped when they reach a proper position within a chamber and/or zone. The position of the VIG assembly may be determined, for example, by photo-eye or other detection means. By way of example and without limitation, the position may be the center of a particular chamber, aligned within particular horizontal and vertical positions (e.g., as described in greater detail below in relation to FIG. 6), etc. In certain example embodiments, it may be advantageous to temporarily stop a VIG assembly at a particular location, for example, to allow the VIG assembly to heat sufficiently, to allow a solder frit to melt, etc.

In certain example embodiments, multiple VIG assemblies may be fed into the oven 50 at the same time so that they are processed in batch. For example, in a five-chamber oven like the one shown in FIG. 5, up to five VIG assemblies may be processed by the oven at a time, with the process being started and stopped in dependence on the progress of each chamber. For example, the edge sealing zone may require more time than the cooling performed in the exit zone chambers. Thus, there may be some delay built into the process to account for the different process times of the different zones and/or chambers.

The entrance zone (e.g., chambers 1 and 2 in the FIG. 5 example embodiment) is equipped with substantially uniform heat sources so that the VIG assembly is heatable in stages. That is, substantially uniform heat may be applied to the VIG assembly so as to substantially uniformly heat the entire VIG assembly. Heating may be accomplished via IR radiation from an IR heat source or other means so as to reduce disturbance of the VIG assembly or its contents.

In an edge sealing zone (e.g., chamber 3 of FIG. 5), substantially uniform heating sources are installed to maintain the VIG assembly as a wiole at a predetermined background temperature. This may be accomplished by maintaining the entire VIG assembly at the intermediate temperature from the entrance zone and/or slightly increasing the temperature from the entrance zone. In the meantime, substantially linear focused IR heat sources 56 supply localized heating to the perimeter of the VIG assembly so as to melt the ceramic frit applied to the edges. IR heat may be focused on peripheral edges, for example, by means of a parabolic mirror on an edge opposite to the VIG assembly. Further details of an example focusing mechanism are provided below with reference to FIG. 7. Although this particular zone is termed an edge sealing zone, it will be appreciated that some edge sealing may occur in other zones. For example, most melting will occur within the edge sealing zone and some edge sealing will take place once the IR radiation sources are powered down, although the edges may continue to seal (e.g., the frit may begin or continue to harden) while in the exit zone.

Figure 6:
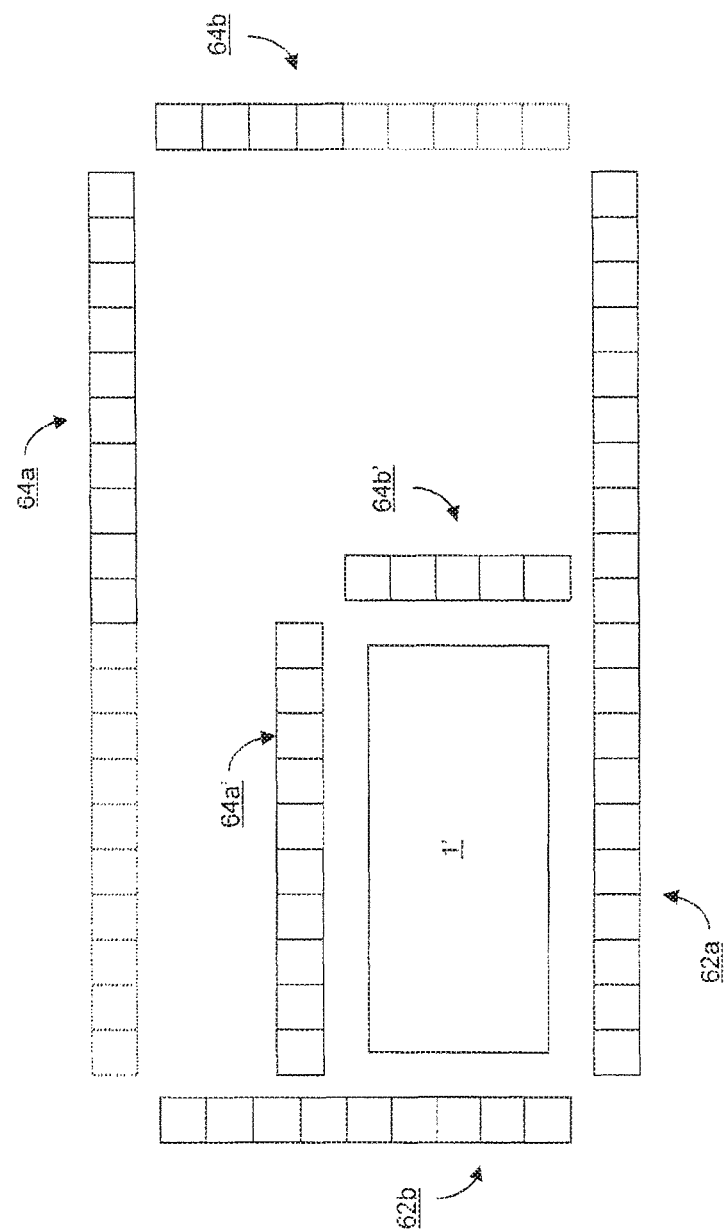
FIG. 6 is an overhead view of the moving concentration of IR heat sources in the edge sealing zone of a unitized oven in accordance with an example embodiment.

FIG. 6 is an overhead view of the moving concentration of IR heat sources 62 and 64 in the edge sealing zone of a unitized oven in accordance with an example embodiment. As shown in FIG. 6, the frit melting oven is designed such that variously sized VIG assemblies may be sealed. In certain example embodiments, one corner of the focused IR bank is fixed in position (e.g., the corner proximate to banks 62a-b). In the FIG. 6 example, banks 62a-b are fixed in position. In such example arrangements, only two sides of the focused IR bank would need to be repositioned to ensure proper frit melting. The IR sources also may be segmented into sections so that a part or all of the sections can be turned on at any time to adjust the length of heating to that of the VIG assembly size. Parts of these IR source banks 64a-b may be moved into various positions around the perimeter of the VIG assembly by mechanical means, such as, for example, arms, rollers on a rail, and/or other linkages. In FIG. 6, this is shown as banks 64a-b being segmented and bank segments 64a'-b' being moved from their initial positions (designated by the dotted lines in the banks 64a-b) to positions proximate to the VIG assembly 1' (designated by the solid lines) to be edge sealed. In the FIG. 6 embodiment, only IR sources corresponding to banks 64a'-b' and parts of 62a-b would be turned on; the rest of the IR sources in banks 64a-b and the non-proximate IR sources in banks 62a-b need not be turned on (e.g., they would may remain off).

Thus, as is shown in FIG. 6, the localized heat source comprises first, second, third, and fourth banks of infrared heat source elements, the banks being arranged such that the infrared heat source is substantially rectangularly shaped within the edge melting zone. The first and second banks are fixed in position and constitute two substantially perpendicular legs of the substantially rectangularly shaped infrared heat source, and the third and fourth banks constitute the other two substantially perpendicular legs of the substantially rectangularly shaped infrared heat source. The infrared heat source elements of the second and third banks are movable in dependence on a size of the unit so as to move closer to the edges to be sealed.

In addition, the angle of the focusing mirror may be adjustable in certain example embodiments to allow the heat to be focused more precisely on the VIG assembly perimeters (as described in greater detail below with reference to FIG. 7). In certain example embodiments, the IR segmented source movement and/or focusing may be computer-controlled to adjust the results of the individual units. Still further, the VIG assembly 1' to be edge sealed may be elevated such that it is more proximate to the IR sources. This may be accomplished by moving it into a proper X-Y position with respect to the IR banks 62a-b, moving portions of the movable IR banks 64a-b, and lifting the VIG assembly 1' into position.

By way of example and without limitation, the IR sources within the banks may be IR tubes. The IR tubes may be close enough to each to provide heating across the edges of the VIG assembly (e.g., without leaving "gaps." or unheated or substantially differently heated areas around the edges), but also may be far enough away from each other to allow for movement of such tubes. Thus, by way of example and without limitation, the IR tubes may be located approximately 5 mm apart in certain example embodiments. The sizes of the banks may vary in dependence on the needs of the VIG unit manufacturing process. Also by way of example and without limitation, banks of about 2-3 meters should accommodate most standard VIG unit manufacturing requirements.

Referring once again to FIG. 5, the VIG assembly may be cooled down in an exit zone comprising one or more chambers, e.g., in a stepwise manner via chambers 4 and 5 of FIG. 5. When a stepwise exit zone arrangement is implemented, each successive exit zone chamber may be maintained at a lower temperature than the previous exit zone chamber. This arrangement may be enabled by using forced convective air cooling, cooling water piping, and/or other cooling means suitable for removing heat from the particular exit zone chamber. Ultimately, the VIG assembly may be rolled out of the oven 50 through exit door 58 via rollers 52b.

Figure 7:
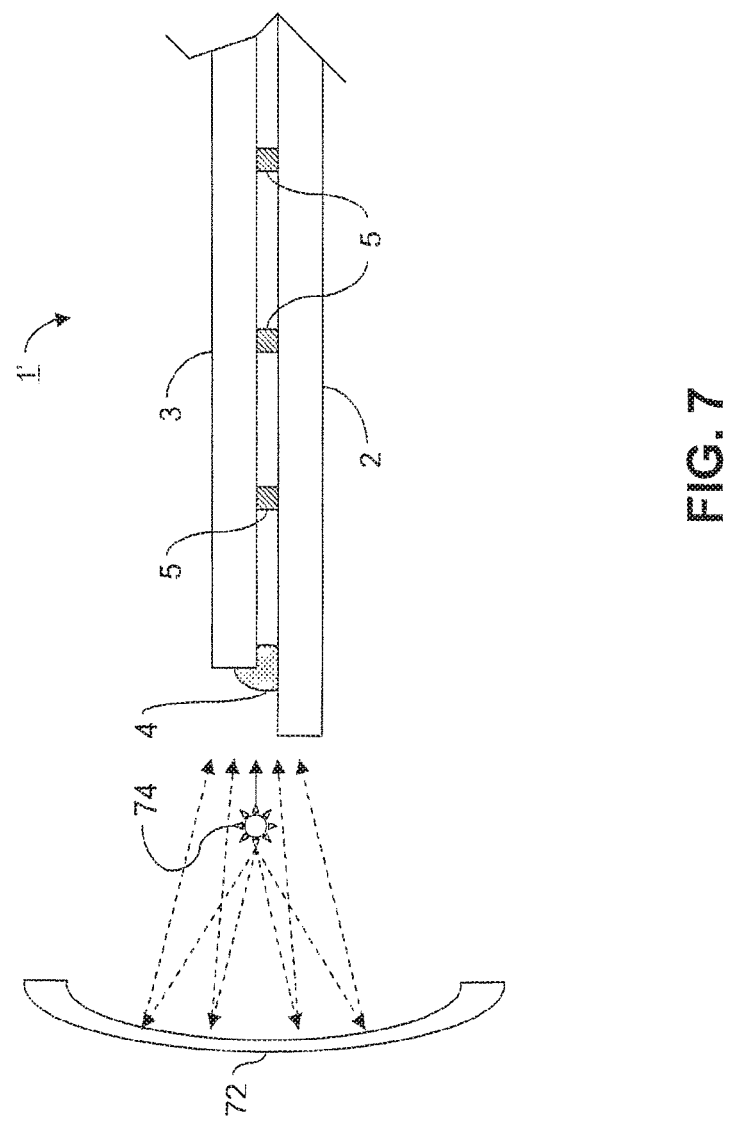
FIG. 7 is a side view of a concentration and/or focusing mirror located proximate to an IR heating element in accordance with an example embodiment.

FIG. 7 is a side view of a concentration and/or focusing mirror 72 located proximate to an IR heating element 74 in accordance with an example embodiment. It will be appreciated that any type of concentrating and/or focusing mechanism may be used in connection with certain other example embodiments. IR radiation from IR heating element 74 is focused and/or concentrated by the parabolic mirror 72 onto or proximate to solder frit 4. The mirror 72 may be moved and/or repositioned to cause more or less of the peripheral edges of the VIG assembly 1' to be heated, to focus IR radiation to or away from the substrates 2 and 3, etc.

A more detailed description of the VIG assembly edge sealing process will now be provided. A pre-assembled VIG assembly, which may include a pre-applied and fired perimeter frit ink, enters the oven. In the entrance zone, the VIG assembly is heated up to a predetermined temperature of between about 200-300° C. This may be accomplished using staged heating in one or more entrance chambers, so that the entire VIG assembly is pre-heated to one or more intermediate temperatures. In general, the VIG assembly will enter into the oven at room temperature (e.g., which typically is about 23° C., although it will be appreciated that other processing environments and/or conditions may implement a different "room temperature"). The entire VIG assembly may be heated to about 75° C. in a first entrance zone chamber and then to about 150° C. in a second entrance zone chamber. It will be appreciated that the pre-heating temperatures may vary by about ±50° C.

In the edge sealing zone, the entire VIG assembly is heated to about 200° C., and an IR heat source (e.g., a computer-controlled substantially linear IR heat source) is moved into position and focused around the perimeter of the VIG assembly. The IR heat source is activated at a predetermined distance (e.g., from about 0.5-10 cm) from the edge of the VIG assembly, depending in part on the focusing/concentrating mirror, whether the IR radiation is meant to "contact" the top and/or bottom substrates or just the sides proximate to the frit, etc. As noted above, the IR heat source is focused, e.g., by means of a parabolic mirror provided on a side of the IR heat source opposite to the VIG assembly. The temperature of the frit on the perimeter of the VIG assembly is controlled to about 350-500° C., which is suitable to melt the frit but still below the melting point of the glass substrates, which varies from about 600-800° C. based on the composition of the glass. During the localized heating process in the edge sealing zone, the glass temperature remains at the background temperature. Accordingly, heat strengthened or tempered glass, if utilized, is not de-tempered or suffers a reduced amount of de-tempering during the frit heating and/or melting processes.

Following the frit melting in the edge sealing zone, the VIG assembly is transported to the exit zone. The exit zone may include one or more temperature ramp-down areas (or chambers). The temperature is reduced so that the VIG assembly is at a temperature less than about 100° C. when it exits the oven. In certain example embodiments, in a first exit chamber, the temperature of the entire VIG assembly will be reduced to about 150° C. and then to about 75° C. in a second exit chamber. As above, ramp-down temperatures may vary from these figures by as much as about ±50° C.

Figure 8:
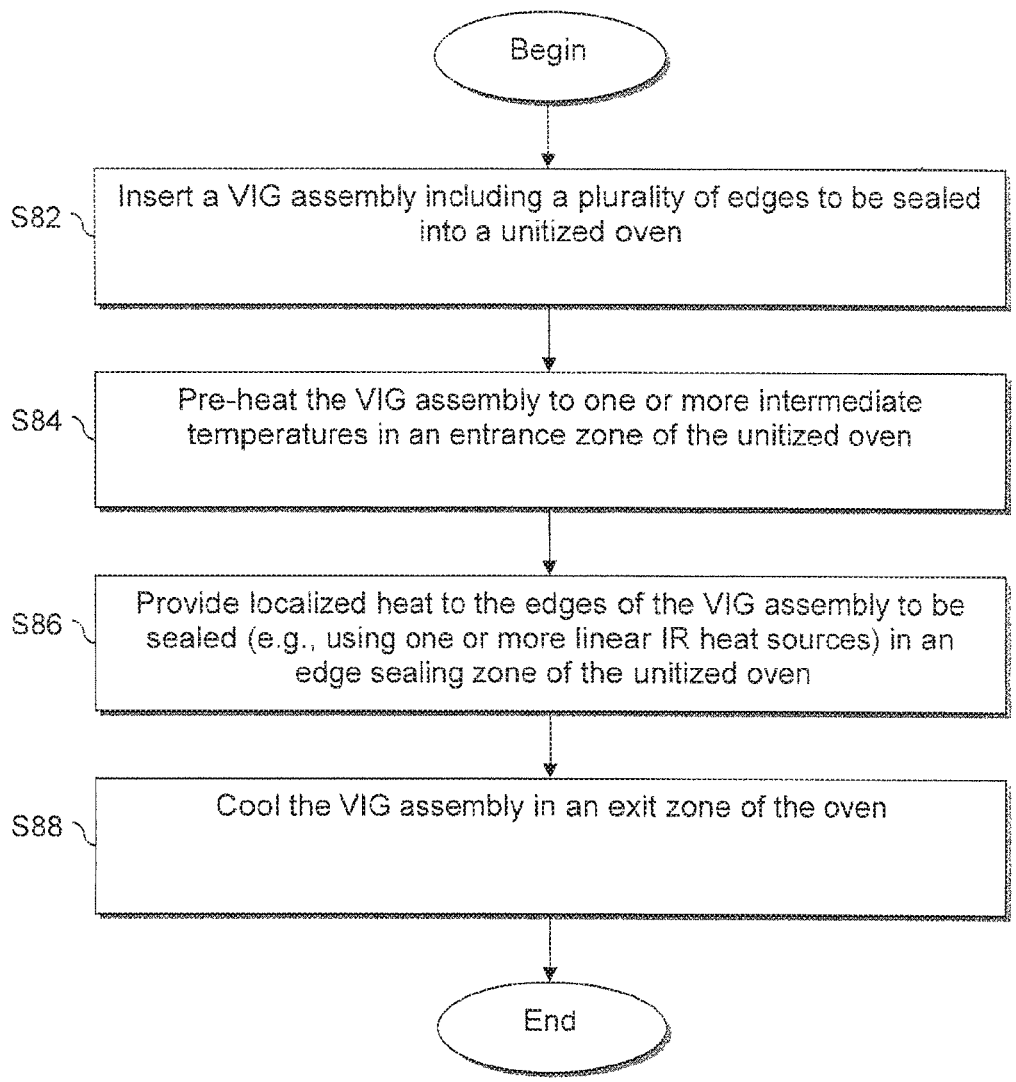
FIG. 8 is an illustrative flowchart showing a process for providing localized heating to frit edge seals of a VIG assembly via a unitized oven, in accordance with an example embodiment.

FIG. 8 is an illustrative flowchart showing a process for providing localized heating to frit edge seals of a VIG assembly via a unitized oven, in accordance with an example embodiment. In step S82, a VIG assembly including a plurality of edges to be sealed is inserted into a unitized oven. A roller conveyer may convey the VIG assembly into the oven, e.g., through a door. In step S84, the VIG assembly is pre-heated to one or more intermediate temperatures in an entrance zone of the unitized oven. The intermediate temperature(s) is/are below the melting points of glass and the frit along the edge to be sealed.

Localized heat is provided to the edges of the VIG assembly to be sealed (e.g., using one or more substantially linear IR heat sources, producing IR radiation having a near infrared wavelength (e.g., a wavelength of about 0.7-5.0 μm) and, more preferably, of about 1.1-1.4 μm) in an edge sealing zone of the unitized oven in step S86. The localized heat is at a temperature above the intermediate temperature(s) and is sufficient to cause the frit around the edges to melt. The temperatures may be chosen in dependence on the composition of the frit material. The VIG assembly, apart from the areas proximate to the peripheral edges to be sealed, are kept at a temperature close to that of the intermediate temperature (e.g., at a temperature sufficiently low so as to avoid melting of the glass, not varying by more than about ±50° C. from an intermediate temperature).

In a step not shown, to provide localized heating, a plurality of heat sources (e.g., substantially linear IR heat sources) are provided, e.g., within a bank. At least some of the banks may be fixed in position. The VIG assembly may be positioned proximate to the fixed banks so that at least some of the edges to be sealed are adjacent to the fixed banks. Additional banks including movable heat sources may be positioned so as to provide heat proximate to the edges of the VIG assembly that are not adjacent to the fixed banks. The areas to be heated may be more finely tuned by providing a concentration and/or focusing mirror.

Referring once again to FIG. 8, in step S88, the VIG assembly is cooled in an exit zone of the oven. The pre-heating and/or cooling of the VIG assembly may be staged so as to reduce the chances of breakage of the VIG assembly and/or de-tempering of the substrates comprising the VIG assembly. In certain example embodiments, multiple chambers may be provided for one or more of the zones. In connection with such embodiments, multiple chambers may be provided for the ramping-up of temperatures and/or the cooling processes, e.g., when the heating and/or cooling processes are staged. In certain other embodiments, a single chamber may be configured to perform the functionality of multiple zones (e.g., a single chamber may pre-heat and/or cool the substrate, a single chamber may pre-heat the substrate and/or provide localized heat to the edges, a single chamber may provide localized heat to the edges and/or cool the substrate, etc.).

Thus, certain example embodiments advantageously heat, melt, and cool the flit quickly. This helps produce a temperature gradient proximate to the edges of the VIG assembly. The temperature gradient, in turn, helps reduce de-tempering and/or the chances of breakage of the glass. In certain example embodiments, at least certain portions of a thermally tempered glass sheet(s)/substrate(s) of the VIG unit lose no more than about 50% of original temper strength.

Certain example embodiments provide heat to the edges of the VIG using a localized heat comprising an array of focused IR heat sources so that while the non-edge areas remain at relatively low temperature, the frit around the perimeter is melted. The array of IR heat sources reduces the number of moving parts in the localized heating source and does not necessarily require separation between temperature zones some embodiments. The array is installable into a standard belt furnace relatively easily. Another advantage of this design is that it can be used to produce VIG units of various sizes and shapes (e.g., substantially rectangular and substantially non-rectangular shaped VIG units of varying sizes).

Instead of, or in addition to, implementing system of movable heat sources, certain example embodiments may provide localized heating by a substantially stationary array of focused IR sources installed an in-line furnace, such as belt furnace or "coffin" style furnace. The array includes a matrix of W*L number of spot IR sources, each of which covers a fixed area. The On/Off behavior of the spot IR sources may be individually controlled by a computer so that each spot on the edge will be illuminated by the IR sources for a pre-determined fixed total energy, e.g., equal to the amount required to melt the frit. The width of the array may cover the whole effective width of the belt, and the length of the array may provide sufficient heating to melt the frit. The length of the array can be estimated by the equation:

$$E=L*D/V$$

where E is the total energy per unit area used in melting the frit, L is the length of the array, D is the power density of the IR source, and V is the furnace line speed.

The operation of the array of IR sources will now be described in greater detail with reference to FIGS. 9a-9f. For convenience, the individual heat sources will be identified using a naming scheme where each individual source is designated as #LW, with the L- and W-axes being numbered as "1" at the intersection thereof shown in FIG. 9a. Thus, for example, in FIGS. 9a-9f, the upper-left heat source is #98, and the bottom-right heat source is #11.

Figure 9A:
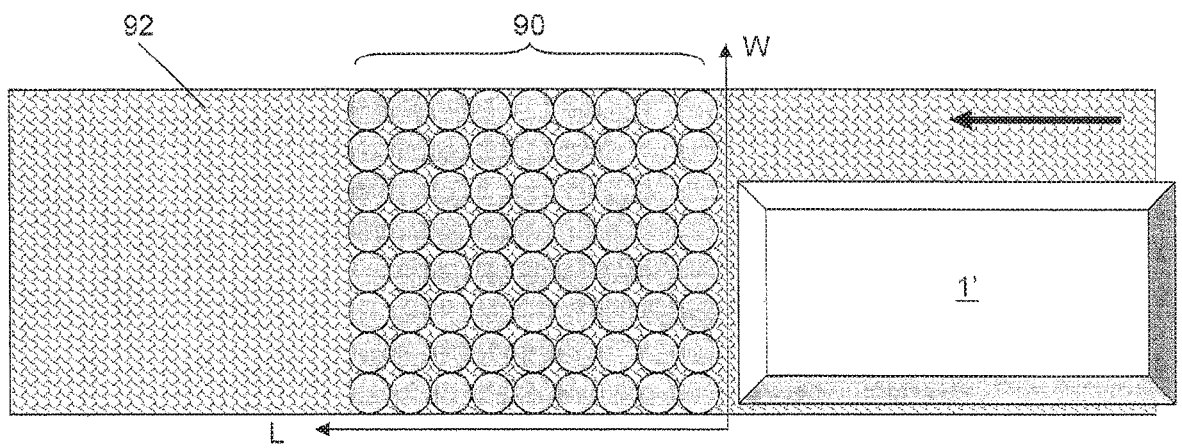
FIG. 9a is an overhead view of the VIG assembly on a belt in an oven prior to its entry under the IR source array, in accordance with an example embodiment.

FIG. 9a is an overhead view of the VIG assembly 1' on a belt 92 in an oven prior to its entry under the IR source array 90, in accordance with an example embodiment. Before the VIG assembly 1' goes under the IR source array 90, all IR sources are turned off (e.g., as designated by all circles in the IR source array 90 being greyed-out).

Figure 9B:
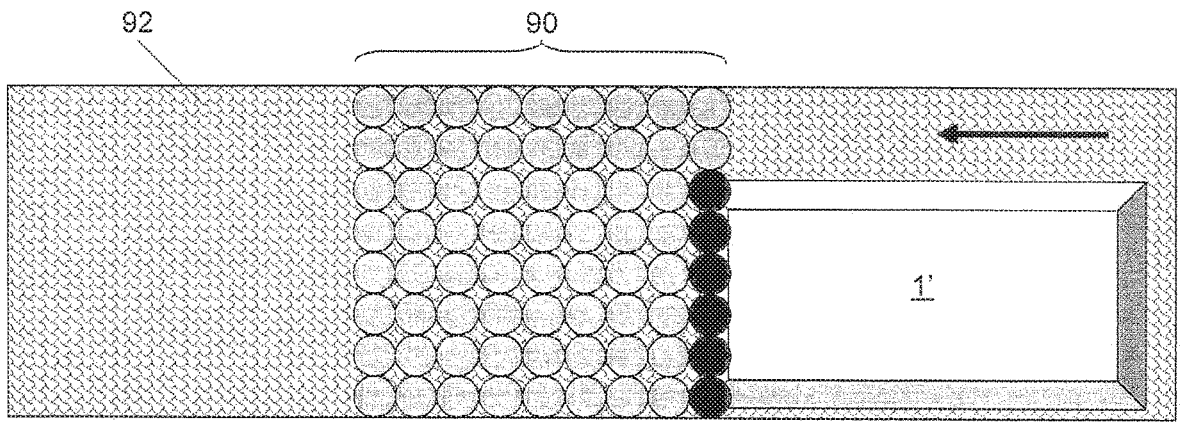
FIG. 9b is an overhead view of the VIG assembly on a belt in an oven entering into the IR source array, in accordance with an example embodiment.

FIG. 9b is an overhead view of the VIG assembly 1' on a belt 92 in an oven entering into the IR source array 90, in accordance with an example embodiment. When the leading edge of the VIG assembly 1' is under the array, the IR sources covering the edge of the VIG assembly 1' to be sealed are turned on. Thus, in the FIG. 9b example, units #11 to #16 are turned on, as designated by the darkened circles. At this time, the other sources in the IR source array 90 remain off.

Figure 9C:
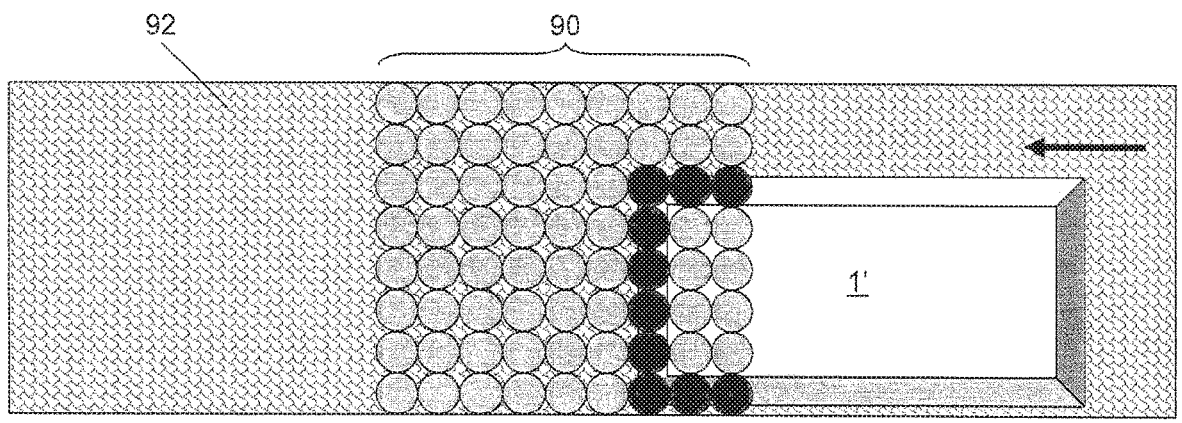
FIG. 9c is an overhead view of the VIG assembly further entering the IR source array such that both the edge to be sealed along the minor axis of the VIG assembly and portions of the edges to be sealed along the major axis of the VIG assembly are both exposed to IR from the IR source array, in accordance with an example embodiment.

FIG. 9c is an overhead view of the VIG assembly 1' further entering the IR source array 90 such that both the edge to be sealed along the minor axis of the VIG assembly 1' and portions of the edges to be sealed along the major axis of the VIG assembly 1' are both exposed to IR from the IR source array 90, in accordance with an example embodiment. As shown in FIG. 9c, the VIG assembly 1' further enters the array region, and the IR sources switch from W=1 to W=2 and then to W=3 to follow the leading edge. In the mean time, #11, #21, #16 and #26 remain "on" because the edges to be sealed along the major axis of the VIG assembly 1' are to be exposed to heat.

Figure 9D:
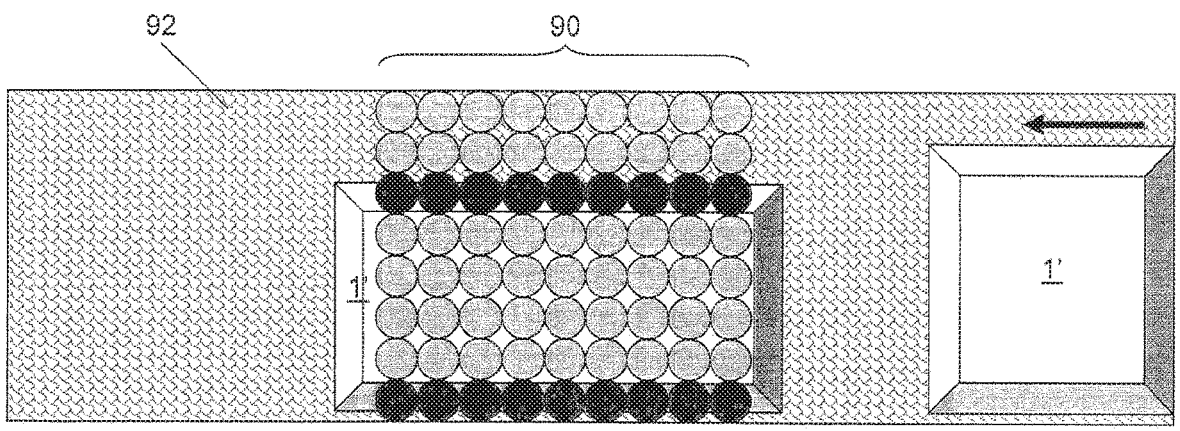
FIG. 9d is an overview of the VIG assembly further entering the IR source array such that only the edges to be sealed along the major axis of the VIG assembly are exposed to IR from the IR source array, in accordance with an example embodiment.

FIG. 9d is an overview of the VIG assembly 1' further entering the IR source array 90 such that only the edges to be sealed along the major axis of the VIG assembly 1' are exposed to IR from the IR source array 90, in accordance with an example embodiment. Once only the side edges are under the array, the "On" pattern becomes two parallel lines in the moving direction, and all other heat sources are turned "Off." As shown in FIG. 9d, a second VIG assembly 1' having edges to be sealed is coming down the belt 92 towards the array.

Figure 9E:
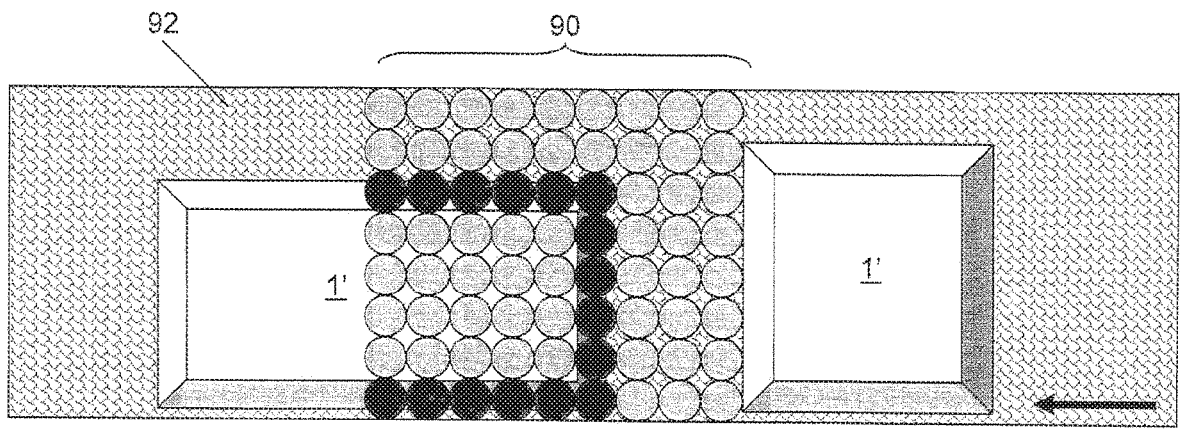
FIG. 9e is an overhead view of the VIG assembly exiting the IR source array, in accordance with an example embodiment.

FIG. 9e is an overhead view of the VIG assembly 1' exiting the IR source array 90, in accordance with an example embodiment. As the trailing edge enters the array, the column L=1, 2, 3, . . . , will be turned on again in this order for the trailing edge. The whole column will be completely off after the trailing edge passes until the next assembly 1' enters. By the time the VIG assembly 1' leaves the array region 90, every spot on the perimeter has received a substantially equal amount of energy sufficient to melt the frit.

Figure 9F:
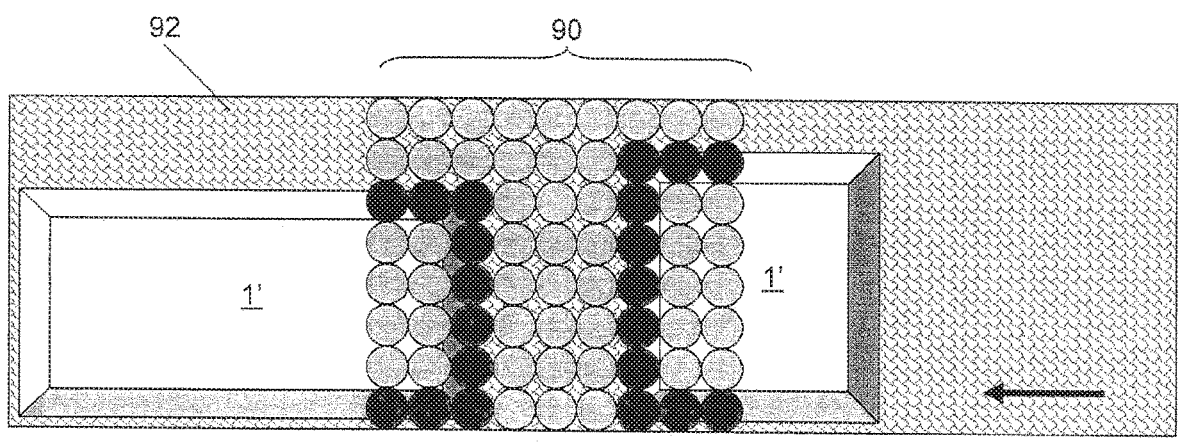
FIG. 9f is an overhead view of a second VIG assembly entering the IR source array as a first VIG assembly exits the IR source array in accordance with an example embodiment.

FIG. 9f is an overhead view of a second VIG assembly 1' entering the IR source array 90 as a first VIG assembly 1' exits the IR source array 90 in accordance with an example embodiment. As can be seen from FIG. 9f, the first and second VIG assemblies 1' are differently sized. Thus, when the second VIG assembly 1' enters the array region, the process will repeat, except that row W=7 will be on because of larger width for the second unit.

Thus, it will be appreciated that each heat source in each row and column of the array is selectively activated in dependence on whether an edge to be sealed is proximate to the heat source (e.g., within an area of heat produced by the heat source). It also will be appreciated that the array is substantially two-dimensional.

The determination of which sources to be turned on may be pre-programmed by an operator in certain example embodiments. In certain example embodiments, photo-eye or other detecting mechanisms may be used to determine the size and/or position of the VIG assembly, e.g., to determine the heat sources in the array to be turned on and the time at which they should be turned on.

It will be appreciated that the energy intensity produced by a single IR heat source (e.g., in an array) is substantially normally distributed across an area such that the energy emitted is highest at the center of the area. Thus, an arrangement that incorporates an array of spaced-apart IR heat sources may sometimes create "stripes" of high and low energy areas. Sometimes, this may result in localized and non-localized melting. That is, sometimes just enough or too much energy will be applied to a certain area or areas, while not enough energy will be provided to an adjacent area or areas.

Figure 10:
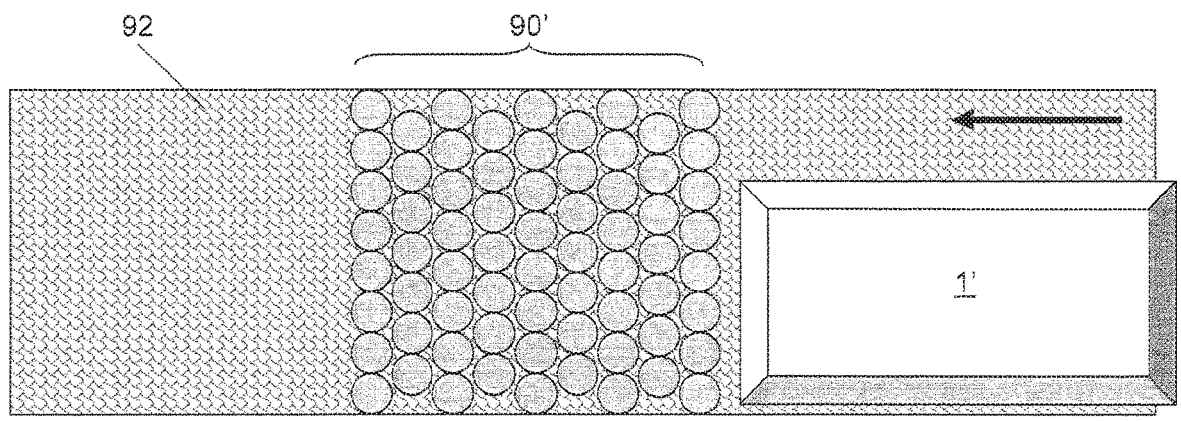
FIG. 10 is an overhead view of an IR source array incorporating a staggered IR heat source design, in accordance with an example embodiment.

Accordingly, certain example embodiments may incorporate an array of IR heat sources where the heat sources are staggered. FIG. 10 is an overhead view of an IR source array 90' incorporating a staggered IR heat source design, in accordance with an example embodiment. In FIG. 10, the individual heat sources in the array 90' are arranged such that, moving left-to-right, the southeast section of the first heat source is adjacent to the northwest section of the second heat source, and the northeast section of the second heat source is adjacent to the southwest section of the third heat source, etc. This and/or other arrangements may advantageously help provide alternating high and low exposure areas to even out the striping that sometimes may otherwise occur. The staggered IR heat source design of FIG. 10 operates in substantially the same was as the design of FIGS. 9a-9f.

In certain example embodiments, diffusers may be placed proximate to each lamp so as to even out the energy, which otherwise sometimes might be provided according to a particular shape (e.g., circular shape where circular lamps are used) or in stripes as noted above, thus providing a substantially uniform distribution of heat across the area to be heated. Generally, a diffuser may be provided to each heat source in the array to provide a more uniform heat flux from the heat sources in the array. It will be appreciated that diffusers may be used in connection with either the array design of FIGS. 9a-9f and/or the array design of FIG. 10.

Figure 11A:
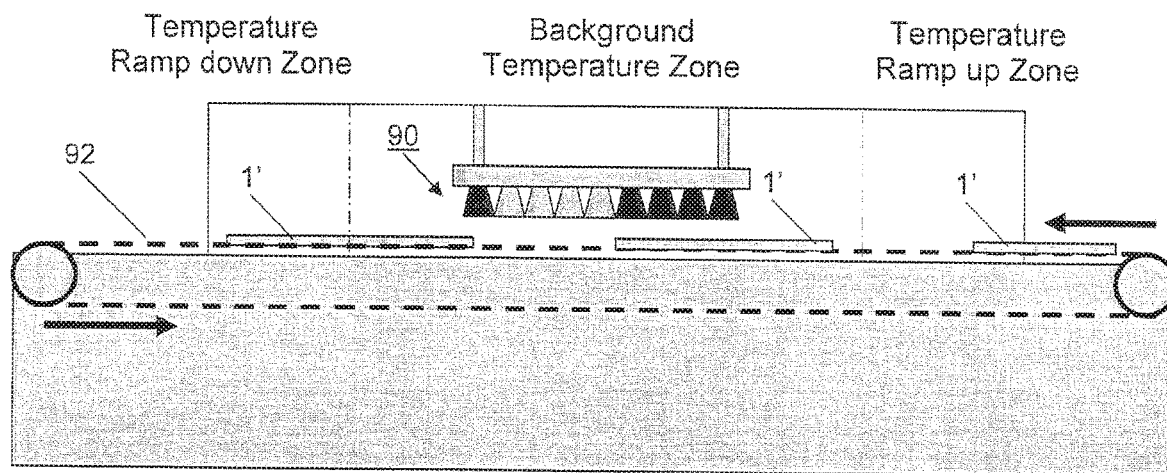
FIG. 11a is a side view of an in-line style belt furnace installed with an array of IR sources in accordance with an example embodiment.

FIG. 11a is a side view of an in-line style belt furnace installed with an array 90 of IR sources. Pre-assembled VIG assemblies 1' enter the furnace and are heated up through a temperature ramp-up zone to reach the predetermined background temperature (typically between about 200-300° C.). An IR array 90 is installed in this background temperature zone and melts the frit around the perimeter of the VIG assemblies 1' in a process described above or other process. During the whole time, the furnace belt 92 may be moving continuously at a constant speed selected to provide sufficient heating to the perimeters of the VIG assemblies 1' to ensure good hermetic seals around the edges of the VIG assemblies 1'. The pumping port tube seal, if necessary, can also be sealed in the same or other fashion using the IR array 90 at the same time. The individual IR heat sources are switched on and off by computer-control to provide adequate preferential heating to the edges of the VIG assemblies 1'. The temperature of the frit on the edge of the VIG assemblies 1' is controlled between about 350-500° C., suitable to melt frit but below glass melting point. In the meantime, the glass temperature remains at or close to the background temperature. The VIG assembly 1' is then transported through temperature ramp down zones until it cools down, e.g., to less than about 100° C. when it exits the oven. As noted above, the zones may be separate chambers or they may be the same chambers in certain example embodiments.

It will be appreciated that when turning on a single IR heat source, the energy produced is substantially normally distributed over time. Thus, the energy will often ramp-up, stabilize, and then ramp-down. Accordingly, in certain example embodiments, a computer-controlled system may advantageously turn on a single lamp before the VIG assembly is underneath it to ensure that the intended energy reaches the area, and/or also turn off the lamp before the VIG assembly exits to reduce the exposure to adjacent areas that should not be heated. Thus, as the unit moves across successive columns of the array, each heat source is activated in the row and column of the array before the edge to be sealed is exposed to heat emanating from the heat source and also deactivated before the edge to be sealed is removed from the heat emanating from the heat source.

Figure 11B:
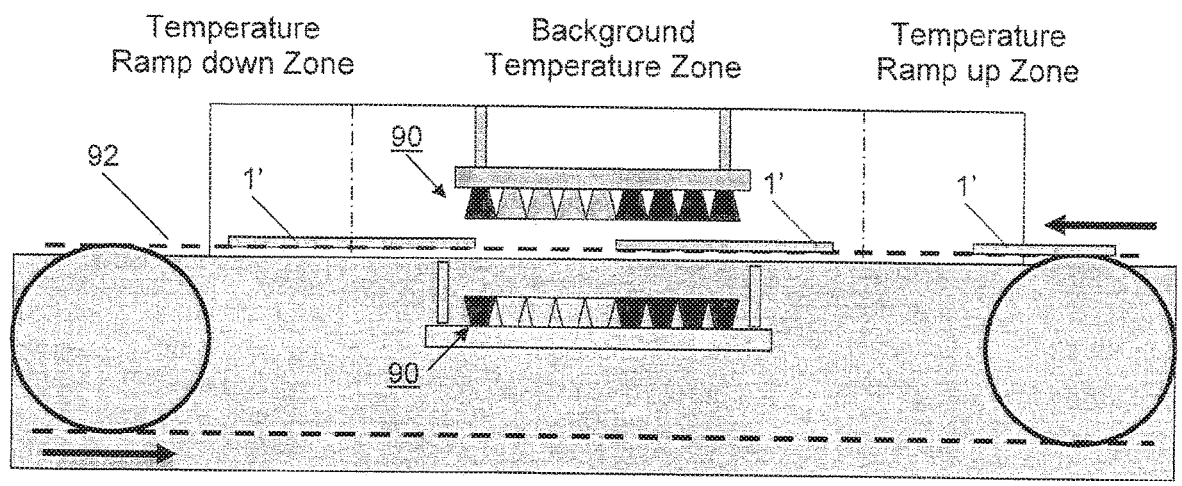
FIG. 11b is a side view of an in-line style belt furnace installed with two arrays of IR sources in accordance with an example embodiment.

FIG. 11b is a side view of an in-line style belt furnace installed with two arrays 90 of IR sources in accordance with an example embodiment. For example, an additional array may be provided between the belt and point upward so that the two arrays heat the edges to be sealed from both sides. That is, heat may be applied to both sides of the frit to ensure faster and/or more uniform melting thereof. The two arrays 90 may be controlled in the same way by the same or different means to ensure that the edges become sealed. Alternatively, a slight delay between on-off cycles or slightly different on-off configuration may be introduced between arrays, e.g., to help reduce the striping problem described above.

It will be appreciated that the example embodiments described herein may be used in connection with a variety of different VIG assembly and/or other units or components. For example, the substrates may be glass substrates, heat strengthened substrates, tempered substrates, etc.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of making a vacuum insulating glass (VIG) unit, the method comprising:
    having first and second substantially parallel spaced-apart thermally tempered glass substrates and an edge seal material comprising frit provided at least partially between the first and second thermally tempered glass substrates for sealing an area proximate an edge of the VIG window unit;
    providing localized near infrared (IR) inclusive heat from about 1.1 to 1.4 µm proximate to an area proximate the edge to be sealed via a two-dimensional array of heat sources so as to at least partially melt the frit;
    cooling the frit and/or allowing the frit to harden in making the vacuum insulating glass (VIG) unit;
    wherein at least some portions of the first and second glass substrates do not lose any more than 50% of original temper strength during formation of the edge seal; and
    evacuating a gap between the first and second thermally tempered glass substrates to a pressure less than atmospheric pressure in making the vacuum insulating glass (VIG) unit.

2. A method of making a vacuum insulating glass (VIG) window unit, the method comprising:
    having first and second substantially parallel spaced-apart glass substrates and an edge seal material provided at least partially between the first and second glass substrates for sealing an area proximate an edge of the VIG window unit;
    pre-heating the glass substrates and the edge seal material to at least one temperature from about 200 to 300 degrees C., which is below a melting point of the first and second glass substrates and below a melting point of the edge seal material;
    providing localized near infrared (IR) inclusive heat from about 1.1 to 1.4 µm proximate to the area proximate the edge to be sealed via a two-dimensional array of heat sources so as to at least partially melt the edge seal material;
    cooling the edge seal material and/or allowing the edge seal material to harden in making the vacuum insulating glass (VIG) window unit; and
    evacuating a gap between the first and second glass substrates to a pressure less than atmospheric pressure in making the VIG window unit, the VIG window unit comprising the glass substrates, the edge seal, and a plurality of spacers between at least the glass substrates.

3. The method of claim 2, wherein the heat sources are arranged in a plurality of rows and/or columns.

4. The method of claim 3, wherein the heat sources in adjacent rows and/or columns are staggered.

5. The method of claim 2, wherein the heat sources comprise spot IR sources.

6. The method of claim 2, wherein the glass substrates are tempered.

7. The method of claim 2, wherein the VIG unit is in a stopped position during said cooling of the edge seal material and/or said allowing the edge seal material to harden in making the vacuum insulating glass (VIG) window unit.

8. The method of claim 2, wherein the near IR heat is directed to the area proximate the edge seal via a parabolic mirror.

9. The method of claim 2, wherein the heat sources comprise IR tubes.

10. The method of claim 2, wherein the heat sources comprise respective linear sources.

11. The method of claim 2, wherein the heat sources comprise respective spot IR sources.

\* \* \* \* \*